United States Patent
Jordan et al.

(10) Patent No.: US 8,679,246 B2
(45) Date of Patent: Mar. 25, 2014

(54) PREPARATION OF AMORPHOUS MIXED METAL OXIDES AND THEIR USE AS FEEDSTOCKS IN THERMAL SPRAY COATING

(75) Inventors: Eric Hopkins Jordan, Storrs-Mansfield, CT (US); Maurice Gell, Somerset, NJ (US); Dianying Chen, Hicksville, NY (US)

(73) Assignee: The University of Connecticut, Farmington, CT (US)

( * ) Notice: Subject to any disclaimer, the term of this patent is extended or adjusted under 35 U.S.C. 154(b) by 406 days.

(21) Appl. No.: 13/008,994

(22) Filed: Jan. 19, 2011

(65) Prior Publication Data

US 2012/0017805 A1   Jan. 26, 2012

Related U.S. Application Data

(60) Provisional application No. 61/296,907, filed on Jan. 21, 2010.

(51) Int. Cl.
*C01D 1/00* (2006.01)

(52) U.S. Cl.
USPC ..................................................... 106/286.4

(58) Field of Classification Search
None
See application file for complete search history.

(56) References Cited

U.S. PATENT DOCUMENTS

| | | | |
|---|---|---|---|
| 4,059,417 A | 11/1977 | Ilmaier et al. | |
| 4,822,415 A | 4/1989 | Dorfman et al. | |
| 5,102,836 A | 4/1992 | Brown et al. | |
| 5,722,602 A | 3/1998 | Kelley | |
| 6,517,802 B1 | 2/2003 | Xiao et al. | |
| 6,579,573 B2 | 6/2003 | Strutt et al. | |
| 7,255,934 B2 | 8/2007 | Hatono et al. | |
| 2003/0126804 A1 | 7/2003 | Rosenflanz et al. | |
| 2006/0199024 A1* | 9/2006 | Lima et al. | 428/469 |
| 2007/0044513 A1 | 3/2007 | Kear et al. | |
| 2007/0107810 A1 | 5/2007 | Farmer | |
| 2008/0064585 A1 | 3/2008 | Wan et al. | |
| 2013/0040538 A1* | 2/2013 | Scrivani et al. | 451/39 |

FOREIGN PATENT DOCUMENTS

WO   WO 2007148931 A1 * 12/2007

OTHER PUBLICATIONS

Afrasiabi et al., "A comparative study on hot corrosion resistance of three types of thermal barrier coatings" YSZ, YSZ+Al2O3 and YSZ/Al2O3, Materials Science & Engineering A 478, 2008, p. 264-269.
Ando et al., "Metastable Alumina Structures in Melt-Extracted Alumina-25 wt% Zirconia and Alumina-42 wt% Zirconia Ceramics", Journal of the American Ceramic Society 74, 2, 1991, p. 410-417.
Berghaus et al., "Suspension Plasma Spraying of Nanostructured WC-12Co Coatings", Journal of Thermal Spray Technology, 15, 2006, p. 676-681.

(Continued)

*Primary Examiner* — Melvin C Mayes
*Assistant Examiner* — Stefanie Cohen
(74) *Attorney, Agent, or Firm* — Cantor Colburn LLP

(57) ABSTRACT

Amorphous mixed metal oxides are used as a feedstock for thermal spray coating. Compared to thermal spray coating methods utilizing crystalline metal oxide feedstocks, the present method reduces energy consumption and expands the range of feedstock chemical compositions. The present method also produces coatings with improved chemical homogeneity. Methods of preparing the amorphous mixed metal oxides are also described.

16 Claims, 4 Drawing Sheets

(56) References Cited

OTHER PUBLICATIONS

Burlacov et al., "Induction plasma-sprayed photocatalytically active titania coatings and their characterisation by micro-Raman spectroscopy", Surface Coatings & Technology 201, 2006, p. 255-264.
Carter et al., "Ceramic Materials", Science and Engineering, 2007, CH 22, p. 400-411, Springer Science+Business Media LLC.
Carter et al., "Cermaic Materials", Science and Engineering, 2007, CH 20, p. 359-364, Springer Science+Business Media LLC.
Chandradass et al., "Synthesis and characterization of zirconia doped alumina nanopowder by citrate-nitrate process", Materials Science & Engineering a 473, 2008, p. 360-364.
Chen et al., "Air-plasma spraying collodial solutions of nanosized ceramic powders", Journal of Materials Science 39, 2004, p. 4171-4178.
Chen et al., "Suspension plasma sprayed composite coating using amorphous powder feedstock", Applied Surface Science 255, 2009, p. 5935-5938.
Chevalier et al., "Nanostructured Ceramic Oxides with a Slow Crack Growth Resistance Clost to Covalent Materials", Nano Letters, vol. 5, No. 7, 2005, p. 1297-1301.
Chevalier et al., "Extending the Lifetime of Ceramic Orthopaedic Implants", Advanced Materials, 12, 2000, p. 1619-1621.
Fauchais et al., "Suspension and solution plasma spraying of finely structured layers: potential application to SOFCs", Journal of Physcis D: Applied Physics 40, 2007, p. 2394-2406.
Fauchais et al., "Understanding of Suspension DC Plasma Spraying of Finely Structured Coatings for SOFC", IEEE Transactions of Plasma Science, vol. 33, No. 2, 2005, p. 920-930.
Gell et al., "Development and implementation of plasma sprayed nanostructured ceramic coatings", Surface and Coatings Technology 146-147, 2001 p. 48-54.
Jordan et al., "Fabrication and evaluation of plasma sprayed nanostructured alumina-titania coatings with superior properties", Materials Science and Engineering A301, 2001, p. 80-89.
Kear et al., "Chemical Processing and Applications for Nanostructured Materials", NanoStructured Materials, vol. 6, p. 227-236, 1995.
Lima et al., "Thermal spray coatings engineered from nanostructured ceramic agglomerated powders for structural, thermal barrier and biomedical applications: a review", Journal of Thermal Spray Technology 16, 1, 2007, p. 40-63.
Lima et al., Superior Performance of High-Velocity Oxyfuel-Sprayed Nanostructured $TiO_2$ in Comparison to Air Plasma-Sprayed Conventional $Al_2O_3$-13$TiO_2$, Journal of Thermal Spray Technology, 14, 3, 2005, p. 397-404.
Lima et al., "From APS to HVOF spraying of conventional and nanostructured titania feedstock powders: a study on the enhancement of the mechanical properties", Surfact & Coatings Technology 200, 2006, p. 3428-3437.
Lima et al., "Enhanced ductility in thermally sprayed titania coating synthesized using a nanostructured feedstock", Materials Science & Engineering A 395, 2005, p. 269-280.
O et al., "Fabrication and synthesis of alpha-alumina nanopowders by thermal decomposition of ammonium aluminum carbonate hydroxide (AACH)", Colloids and Surfaces a Physicochemical and Engineering Aspects 313, 2008, p. 415-418.
Rosenflanz et al., "Bulk glasses and ultrahard nanoceramics based on alumina and rare-earth oxides", Nature 430, 2004, p. 264-269.
Shaw et al., "The dependency of microstructure and properties of nanostructured coatings on plasma spray conditions", Surface & Coatings Technology 130, 2000, p. 1-8.
Toma et al., "Nanostructured Photocatalytic Titania Coatings Formed by Suspension Plasma Spraying", Journal of Thermal Spray Technology 15, 4, 2006, p. 587-592.
Tomaszek et al., "Microstructural characterization of plasma sprayed $TiO_2$ functional coating with gradient of crystal grain size", Surface & Coating Technology 201, 2006, p. 45-56.

\* cited by examiner

PREPARATION OF AMORPHOUS MIXED METAL OXIDES AND THEIR USE AS FEEDSTOCKS IN THERMAL SPRAY COATING

CROSS REFERENCE TO RELATED APPLICATION

This application claims the benefit of U.S. Provisional Patent Application Ser. No. 61/296,907, filed Jan. 21, 2010, which is fully incorporated herein by reference.

STATEMENT REGARDING FEDERALLY SPONSORED RESEARCH & DEVELOPMENT

This invention was made with government support under Grant No. N00017-07-C-0337, awarded by the Defense Advanced Research Projects Agency. The government has certain rights in the invention.

BACKGROUND OF THE INVENTION

The thermal spray process has been widely used to deposit nanostructured coatings for industrial applications, including aerospace, pulp and paper, machinery, petroleum and petrochemical, biomedical, etc. D. Mateyka, Plasma Spraying of Metallic and Ceramic Coatings, John Wiley & Sons, New York, 1989. Nanostructured coatings can have improved mechanical properties compared to those observed in conventional coatings. M. Gell, E. H. Jordan, Y. H. Sohn, D. Goberman, L. Shaw, T. D. Xiao, "Development and implementation of plasma sprayed nanostructured ceramic coatings", Surface & Coatings Technology, 146 (2001) 48-54; E. H. Jordan, M. Gell, Y. H. Sohn, D. Goberman, L. Shaw, S. Jiang, M. Wang, T. D. Xiao, Y. Wang, P. Strutt, "Fabrication and evaluation of plasma sprayed nanostructured alumina-titania coatings with superior properties", Materials Science and Engineering A Structural Materials Properties Microstructure and Processing, 301 (1) (2001) 80-89; R. S. Lima, B. R. Marple, "Superior performance of high-velocity oxyfuel-sprayed nanostructured TiO2 in comparison to air plasma-sprayed conventional Al2O3-13TiO2", Journal of Thermal Spray Technology, 14 (3) (2005) 397-404; R. S. Lima, B. R. Marple, "Enhanced ductility in thermally sprayed titania coating synthesized using a nanostructured feedstock", Materials Science and Engineering A Structural Materials Properties Microstructure and Processing, 395 (1/2) (2005) 269-280; R. S. Lima, B. R. Marple, "From APS to HVOF spraying of conventional and nanostructured titania feedstock powders: a study on the enhancement of the mechanical properties", Surface & Coatings Technology, 200 (11) (2006) 3428-3437; R. S. Lima, B. R. Marple, "Thermal spray coatings engineered from nanostructured ceramic agglomerated powders for structural, thermal barrier and biomedical applications: a review", Journal of Thermal Spray Technology, 16 (1) (2007) 40-63; L. L. Shaw, D. Goberman, R. M. Ren, M. Gell, S. Jiang, Y. Wang, T. D. Xiao, P. R. Strutt, "The dependency of microstructure and properties of nanostructured coatings on plasma spray conditions", Surface & Coatings Technology, 130 (1) (2000) 1-8. Thermal spray ceramic coatings are typically made using a crystalline powder feedstock. Individual crystalline nanoparticles cannot be thermally sprayed using production powder feeders. These nanosized particles would clog the hoses and fittings that transport the powder particles from the powder feeder to the thermal spray torch. R. S. Lima, B. R. Marple, "Thermal spray coatings engineered from nanostructured ceramic agglomerated powders for structural, thermal barrier and biomedical applications: a review", Journal of Thermal Spray Technology, 16 (1) (2007) 40-63; Z. Chen, R. W. Trice, M. Besser, X. Y. Yang, D. Sordelet, "Air-plasma spraying colloidal solutions of nanosized ceramic powders", Journal of Materials Science, 39 (13) (2004) 4171-4178. To overcome this problem, reconstitution of individual nanoparticles into spherical micrometer-sized granules is necessary. M. Gell, E. H. Jordan, Y. H. Sohn, D. Goberman, L. Shaw, T. D. Xiao, "Development and implementation of plasma sprayed nanostructured ceramic coatings", Surface & Coatings Technology, 146 (2001) 48-54; E. H. Jordan, M. Gell, Y. H. Sohn, D. Goberman, L. Shaw, S. Jiang, M. Wang, T. D. Xiao, Y. Wang, P. Strutt, "Fabrication and evaluation of plasma sprayed nanostructured alumina-titania coatings with superior properties", Materials Science and Engineering A Structural Materials Properties Microstructure and Processing, 301 (1) (2001) 80-89; L. L. Shaw, D. Goberman, R. M. Ren, M. Gell, S. Jiang, Y. Wang, T. D. Xiao, P. R. Strutt, "The dependency of microstructure and properties of nanostructured coatings on plasma spray conditions", Surface & Coatings Technology, 130 (1) (2000) 1-8.

Recently, a suspension plasma spray (SPS) process has been developed for the deposition of nanostructured coatings. See, e.g., Z. Chen, R. W. Trice, M. Besser, X. Y. Yang, D. Sordelet, "Air-plasma spraying colloidal solutions of nano-sized ceramic powders", Journal of Materials Science, 39 (13) (2004) 4171-4178; P. Fauchais, R. Etchart-Salas, C. Delbos, M. Tognonvi, V. Rat, J. F. Coudert, T. Chartier, "Suspension and solution plasma spraying of finely structured layers: potential application to SOFCs", Journal of Physics D Applied Physics, 40 (8) (2007) 2394-2406; I. Burlacov, J. Jirkovsky, M. Muller, R. B. Heimann, "Induction plasma-sprayed photocatalytically active titania coatings and their characterization by micro-Raman spectroscopy", Surface & Coatings Technology, 201 (1/2) (2006) 255-264; R. Tomaszek, L. Pawlowski, L. Gengembre, J. Laureyns, Z. Znamirowski, J. Zdanowski, "Microstructural characterization of plasma sprayed TiO2 functional coating with gradient of crystal grain size", Surface & Coatings Technology, 201 (1/2) (2006) 45-56; F. L. Toma, G. Bertrand, D. Klein, C. Coddet, C. Meunier, "Nanostructured photocatalytic titania coatings formed by suspension plasma spraying", Journal of Thermal Spray Technology, 15 (4) (2006) 587-592; J. O. Berghaus, B. Marple, C. Moreau, "Suspension plasma spraying of nanostructured WC-12Co coatings", Journal of Thermal Spray Technology, 15 (4) (2006) 676-681; P. Fauchais, V. Rat, U. Delbos, J. F. Coudert, T. Chartier, L. Bianchi, "Understanding of suspension DC plasma spraying of finely structured coatings for SOFC", IEEE Transactions on Plasma Science, 33 (2) (2005) 920-930. In SPS, crystalline nanoparticles are dispersed in a solvent such as water or ethanol to form a suspension, and then the suspension is injected into the plasma torch. The crystalline nanoparticles melt in the plasma torch and form a nanostructured coating upon impact with a substrate. In both conventional and suspension plasma spray, crystalline nanosized powders are typically used. However, the preparation of nanocrystalline powders often requires high temperature and long heat treatments and therefore increases the powder preparation cost. For example, Chandradass et al. prepared zirconia doped alumina nanocrystalline powders at 1200° C. for 2 hours. J. Chandradass, J. H. Yoon, D. S. Bae, "Synthesis and characterization of zirconia doped alumina nanopowder by citrate-nitrate process", Materials Science and Engineering A Structural Materials Properties Microstructure and Processing, 473 (1/2) (2008) 360-364. And O et al. synthesized alumina nanopowders at 1150 8 C for 3 h. Y. T. O, S. W. Kim, D. C. Shin, "Fabrication and synthesis of alpha-alumina nanopowders by thermal decomposition of ammonium aluminum carbonate hydroxide (AACH)", *Colloids and Surfaces A Physicochemical and Engineering Aspects*, 313 (2008) 415-418.

Mixed metal oxide composites in general and alumina-zirconia composites in particular have gained wide applications as structural ceramics or protective coatings due to their excellent mechanical and thermal properties. J. Chevalier, A. H. De Aza, G. Fantozzi, M. Schehl, R. Torrecillas, "Extending the lifetime of ceramic orthopaedic implants", *Advanced Materials*, 12 (21) (2000) 1619; J. Chevalier, S. Deville, G. Fantozzi, J. F. Bartolome, C. Pecharroman, J. S. Moya, L. A. Diaz, R. Torrecillas, "Nanostructured ceramic oxides with a slow crack growth resistance close to covalent materials", *Nano Letters*, 5 (7) (2005) 1297-1301; A. Afrasiabi, M. Saremi, A. Kobayashi, "A comparative study on hot corrosion resistance of three types of thermal barrier coatings: YSZ, YSZ+Al2O3 and YSZ/Al2O3", *Materials Science and Engineering A Structural Materials Properties Microstructure and Processing*, 478 (1/2) (2008) 264-269.

There is therefore a desire for simpler processes to form nanostructured metal oxide coatings, and particularly coatings with improved chemical homogeneity.

BRIEF DESCRIPTION OF THE INVENTION

One embodiment is a method of spray coating, comprising feeding an amorphous mixed metal oxide to a thermal spray coating device.

Another embodiment is an alumina-zirconia coated substrate prepared by the methods described herein.

Another embodiment is a nanostructured alumina-zirconia coating, comprising an α-alumina phase comprising a grain size of about 20 to about 30 nanometers; and a tetragonal zirconia phase comprising a grain size of about 14 to about 22 nanometers; wherein the coating is chemically homogeneous on a scale of 300 nanometers.

Another embodiment is a method of preparing amorphous alumina-zirconia particles, comprising: removing water from a aqueous solution to form a solid, wherein the aqueous solution comprises a dissolved aluminum salt and a dissolved zirconium salt; and maintaining the solid at a temperature of about 700 to about 800° C. for about 0.5 to about 5 hours to form the amorphous alumina-zirconia particles.

These and other embodiments are described in detail below.

DETAILED DESCRIPTION OF THE INVENTION

Figure 1:
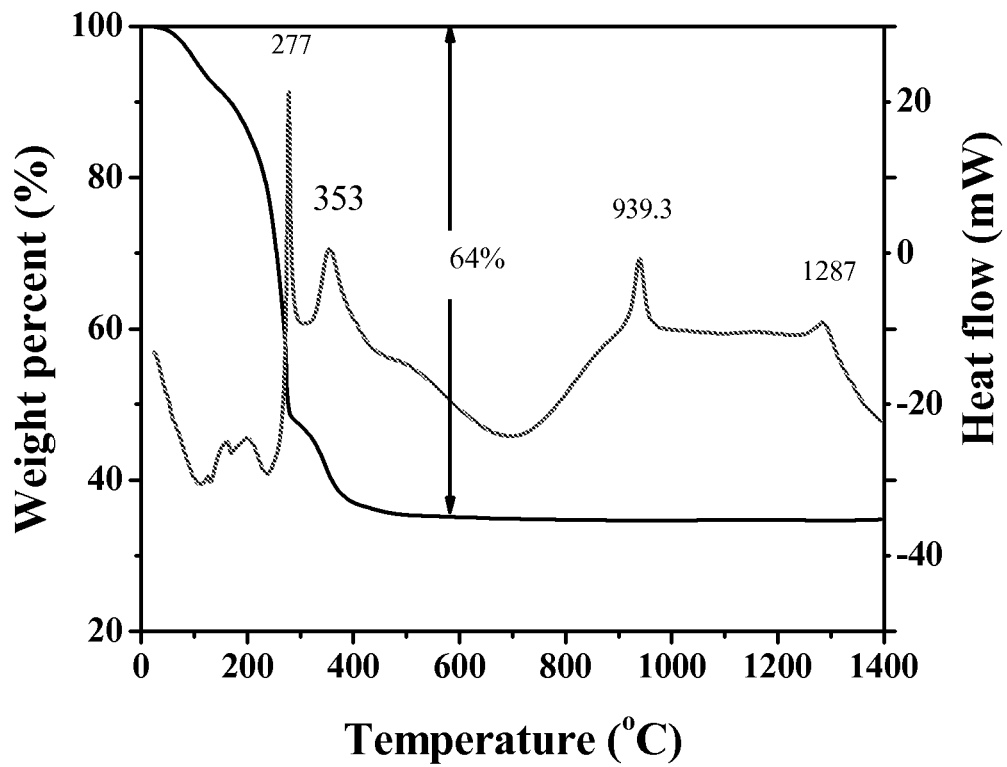
FIG. 1 shows thermogravimetric-differential thermal analysis (TG-DTA) curves for a dried precursor powder at a heating rate of 10° C./minute in air.

The present method utilizes amorphous mixed metal oxides as a feedstock for thermal spray coating. The method has multiple advantages compared to thermal spray coating methods utilizing crystalline metal oxide feedstocks. First, less energy is required to form molten metal oxide from an amorphous feedstock compared to a crystalline feedstock. This advantage can be captured as energy savings in the operation of a thermal spray coating process. It can also be used to expand the range of feedstock chemical compositions for a given thermal spray technique. Specifically, a given thermal spray temperature can melt a wider chemical range of amorphous metal oxides compared to crystalline metal oxides. Second, the amorphous mixed metal oxide feedstocks can be prepared at much lower temperatures than corresponding nanocrystalline powders. This also results in energy savings. Third, unlike even nanocrystalline powders, the amorphous mixed metal oxides can be chemically homogeneous on a molecular scale. Since the melt time in a thermal spray process (e.g., about $10^{-4}$ second) is too short to allow efficient mixing of feedstock particles, the present method produces coatings that are significantly more chemically homogeneous than coatings prepared from crystalline feedstocks.

One embodiment is a method of spray coating comprising feeding an amorphous mixed metal oxide to a thermal spray coating device. As used herein, the term "mixed metal oxide" refers to a metal oxide comprising at least two metals. Any metal capable of forming a metal oxide can be used. Suitable metals include those in Groups 2-13 of the periodic table (including Be, Mg, Ca, Sr, Ba, Ra, Sc, Y, Lu, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd, Hg, Al, Ga, In, and Tl), as well as the lanthanides and actinides. In some embodiments, the mixed metal oxide comprises at least two metals selected from Al, Zr, Mg, Y, Gd, Ce, Ti, Fe, Co, Cr, Mn, Cu, Zn, Pb, and Ga. In some embodiments, the mixed metal oxide comprises at least two metals selected from the group consisting of Al, Zr, Mg, Y, Gd, and Ce. Representative mixed metal oxides include alumina-zirconia ($Al_2O_3$—$ZrO_2$), magnesia-yttria (MgO—$Y_2O_3$), yttria-yttria alumina garnet ($Y_2O_3$—YAG), alumina-yttria alumina garnet ($Al_2O_3$—YAG), alumina-spinel ($Al_2O_3$—$MgAl_2O_4$), zirconia-spinel ($ZrO_2$—$MgAl_2O_4$), zirconia-iron oxide ($ZrO_2$—$Fe_2O_3$), and mixtures thereof.

In a very specific embodiment, the amorphous mixed metal oxide comprises alumina-zirconia. Presently preferred for their low crystallization temperatures are alumina-zirconia compositions comprising about 50 to about 70 weight percent alumina and about 30 to about 50 weight percent zirconia. Within these ranges, the alumina amount can be about 55 to about 65 weight percent, and the zirconia amount can be about 35 to about 45 weight percent. "$Al_2O_3$-40 wt % $ZrO_2$" is used herein as shorthand for an alumina-zirconia composition comprising 60 weight percent alumina and 40 weight percent zirconia.

Those skilled in the art are able to determine whether a mixed metal oxide is amorphous. For example, the amorphous nature of mixed metal oxide particles can be indicated by the absence of peaks in a powder x-ray diffraction pattern.

General methods of preparing amorphous mixed metal oxides are known in the art. These include, for example, C. Barry Carter and M. Grant Norton, "Ceramic Materials Science and Technology", New York: Springer Science+Business Media, LLC (2007), pages 363 and 400-411; A. Rosenflanz, M. Frey, B. Endres, T. Anderson, E. Richards, and C. Schardt, "Bulk glasses and ultrahard nanoceramics based on alumina and rare-earth oxides", *Nature* 430 (2004), 761-764; T. Ando and Y. Shiohara, "Metastable Alumina Structures in Melt-Extracted Alumina-25 wt % Zirconia and Alumina-42 wt % Zirconia Ceramics", *Journal of the American Ceramic Society*, 74(2) (1991), 410-417.

The amorphous mixed metal oxides have a chemical composition consisting essentially of the two or more metals and oxygen. However, small amounts of other elements (e.g., up to 5 weight percent) can be present, depending on the conditions by which the mixed metal oxide is prepared. For example, some hydrogen may be present in the form of metal hydroxide. In some embodiments, the amorphous mixed metal oxide comprises at least 95, 98, or 99 weight percent total of metal and oxygen.

There is no particular limitation on the thermal spray coating technique used in the method. Suitable thermal spray coating techniques include suspension plasma spray coating, air plasma spray coating, vacuum plasma spray coating, ultra-high vacuum plasma spray coating, detonation spray coating, high velocity oxy fuel spray coating, atmospheric fuel spray coating, and combinations thereof These techniques are known and need not be described in detail here.

In some embodiments, the thermal spray coating comprises suspension plasma spray coating utilizing a plasma jet. Using this technique, the amorphous mixed metal oxide can be fed to the plasma jet as a suspension of amorphous mixed metal oxide particles in water, an organic solvent, or a mixture thereof Suitable solvents include, for example, water, ethanol, 1-propanol, 2-propanol, ethylene glycol, dimethylsulfoxide (DMSO), acetonitrile, dimethylformamide (DMF), formic acid, acetone, and mixtures thereof.

In the thermal spray coating method, a molten mixed metal oxide is deposited on a substrate. There is no particular limitation on the substrate, as long as it is thermally and structurally stable to the impact of molten metal oxide particles. Suitable substrates for thermal spray coating include, for example, metals (including steel, stainless steel, nickel-based superalloys, aluminum, and titanium), ceramics, and heat-resistant plastics.

The precise morphology of the as-sprayed metal oxide coating will depend on various processing parameters, including the thermal spray coating technique. For example, when using suspension plasma spray coating, the as-sprayed coating can comprise splats having a diameter of about 0.5 to about 10 micrometers, specifically about 1 to about 5 micrometers, and spheroids having a diameter of about 40 to about 200 nanometers, specifically about 70 to about 150 nanometers.

One advantage of the present method is the chemical homogeneity of the amorphous mixed metal oxide, which relaxes constraints on the particle size of metal oxide feedstock. Thus, micrometer-scale particles can be used to produce nanostructured coatings. In contrast, the use of crystalline metal oxide feedstocks requires nanoparticles or aggregates thereof as feedstocks to produce nanostructured coatings. In some embodiments of the present method, the amorphous metal oxide has an average particle size of about 0.5 to about 200 micrometers, specifically about 1 to about 100 micrometers, more specifically about 2 to about 50 micrometers, still more specifically about 4 to about 40 micrometers, even more specifically about 4 to about 20 micrometers, yet more specifically about 4 to about 10 micrometers.

As demonstrated in the working examples below, when the amorphous mixed metal oxide comprises alumina-zirconia, the as-sprayed coating can comprise an α-alumina phase and a tetragonal zirconia phase. In some embodiments, the α-alumina phase comprises a grain size of about 20 to about 30 nanometers, specifically about 24 to about 28 nanometers, and the tetragonal zirconia phase comprises a grain size of about 14 to about 22 nanometers, specifically about 16 to about 20 nanometers.

Figure 4:
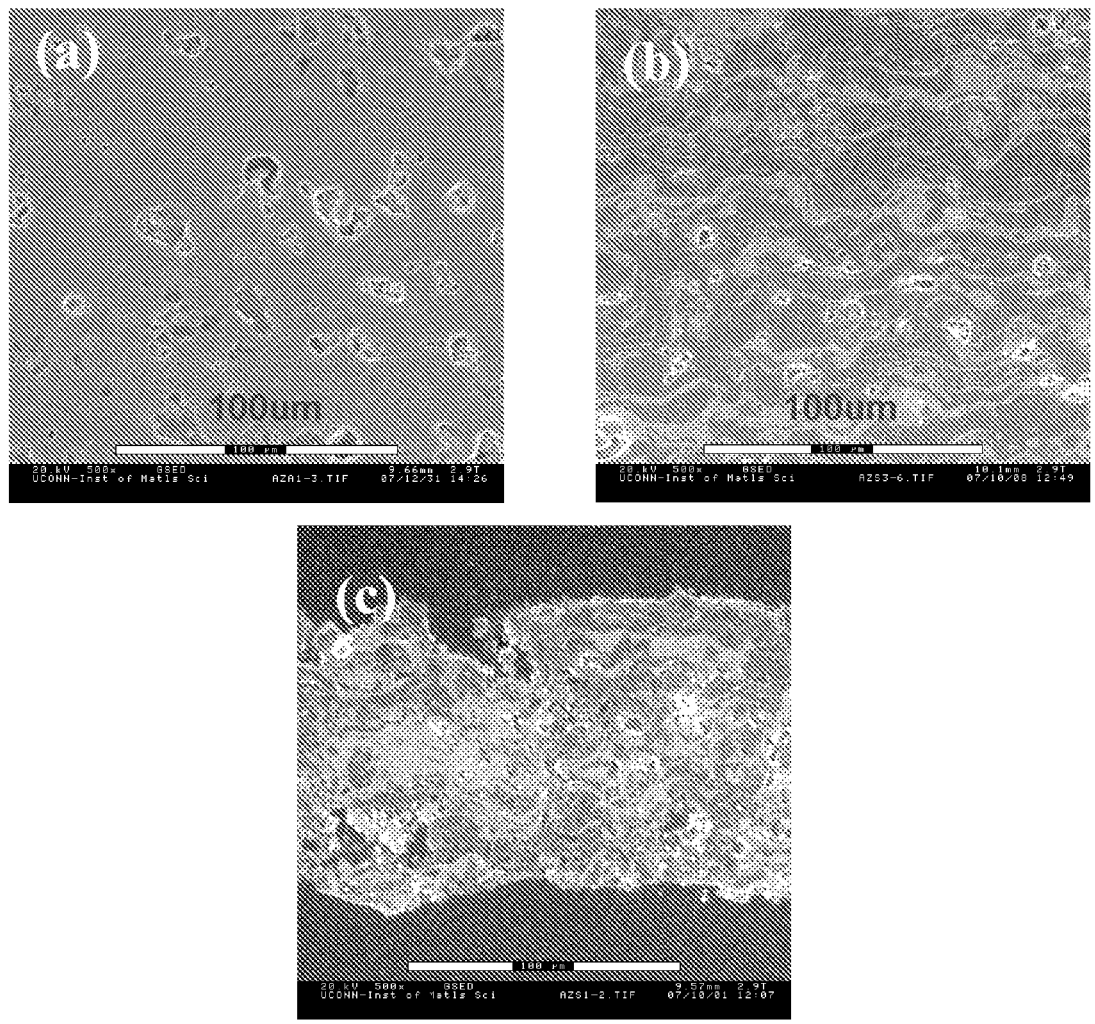
FIG. 4 shows electron micrographs of polished cross section of as-sprayed coatings: (a) suspension plasma sprayed using amorphous powder; (b) conventional plasma sprayed using Al2O3 and ZrO2 mixed powders; (c) suspension plasma sprayed using crystalline $Al_2O_3$ and $ZrO_2$ powders.

An important advantage of the present method is its capability of forming coatings that are chemically homogeneous on the sub-micron scale. Specifically, while other methods may be capable of producing coatings with similar grain sizes, those coatings have a chemically heterogeneous distribution of grains. For example, in an alumina-zirconia coating produced by a conventional method, a given alumina grain is likely to be surrounded by other alumina grains. This is illustrated by FIG. 4(b). In contrast, the present method utilizes a molecularly homogeneous feedstock to produce a chemically homogeneous distribution of grains in the resulting sprayed coating. Thus, in an alumina-zirconia coating produced by the present method, a given alumina grain is likely to be surrounded by a statistical distribution of alumina and zirconia grains. This is illustrated by FIG. 4(a). As a result, when a coating prepared by the present method is chemically analyzed on a scale of several grains (e.g., a scale of 300 nanometers, 200 nanometers, or even 100 nanometers), the chemical composition across that several-grain scale is the same as that of the coating as a whole. In other words, the coating is chemically homogeneous on a scale of 300 (or 200 or 100) nanometers.

One advantage of the method is its ability to form high-density coatings. For example, the coating density can be about 65 to at least 95 percent relative to the density of a bulk mixed metal oxide of the same composition. In some embodiments, the coating density is about 90 to about 95 percent, specifically about 92 to about 94 percent, relative to the density of a bulk mixed metal oxide (e.g., alumina-zirconia) of the same composition.

Another advantage of the method is its ability to form exceptionally hard coatings. Thus, in some embodiments, the as-sprayed coating has a Vickers hardness of about 9 to about 11 gigapascals measured at 23° C. using a 1.6 Newton normal load and a 15 second dwell time. Within the above-stated range, the Vickers hardness can be about 9.5 to about 10.5 gigapascals, specifically about 9.8 to about 10.0 gigapascals.

In a very specific embodiment, the amorphous mixed metal oxide comprises alumina-zirconia; the thermal spray coating device is a suspension plasma spray coating device; the feeding an amorphous mixed metal oxide to a thermal spray coating device comprises introducing to a plasma jet a suspension of amorphous alumina-zirconia particles in an organic solvent; the alumina-zirconia particles comprise about 50 to about 70 weight percent alumina and about 30 to about 50 weight percent zirconia; the amorphous alumina-zirconia particles have an average particle size of about 2 to about 10 micrometers; the method further comprises depositing molten alumina-zirconia on a substrate and cooling the deposited alumina-zirconia to form an as-sprayed coating comprising an α-alumina phase and a tetragonal zirconia phase; the α-alumina phase comprises a grain size of about 20 to about 30 nanometers, and the tetragonal zirconia phase comprises a grain size of about 14 to about 22 nanometers; and the as-sprayed coating is chemically homogeneous on a scale of 300 nanometers or 200 nanometers or 100 nanometers. Another embodiment is an alumina-zirconia coated substrate prepared by the foregoing method.

One embodiment is a nanostructured alumina-zirconia coating, comprising an α-alumina phase comprising a grain size of about 20 to about 30 nanometers, specifically about 24 to about 30 nanometers, and a tetragonal zirconia phase comprising a grain size of about 14 to about 22 nanometers, specifically about 16 to about 20 nanometers; wherein the coating is chemically homogeneous on a scale of 300 nanometers or 200 nanometers or 100 nanometers.

Another embodiment is a method of preparing amorphous alumina-zirconia particles, the method comprising: removing water from a (homogeneous) aqueous solution to form a solid, wherein the aqueous solution comprises a dissolved aluminum salt and a dissolved zirconium salt; and maintaining the solid at a temperature of about 700 to about 800° C., specifically about 725 to about 775° C., for about 0.5 to about 5 hours, specifically about 1 to about 4 hours, more specifically about 1.5 to about 3 hours, to form the amorphous alumina-zirconia particles. The water removal step can be conducted by evaporating water from the aqueous solution at a temperature of about 70 to about 105° C., specifically about 80 to about 100° C., more specifically about 90 to about 100° C. Alternatively, the solution can be frozen and the water removed by lyophilization.

The processing temperature of about 700 to about 800° C. is sufficient to convert the aluminum and zirconium salts to alumina-zirconia, but not so high as to allow crystallization of the alumina-zirconia. Thus, an amorphous alumina-zirconia is obtained.

The method can utilize a variety of aluminum and zirconium salts, as long as the counterions therein thermally decompose during the 700-800° C. processing step in a way that does not interfere with the formation of alumina-zirconia. Suitable aluminum salts include aluminum nitrate, aluminum acetate, aluminum chloride, aluminum isopropoxide, aluminum carbonate, aluminum citrate, hydrates of the foregoing salts, and mixtures thereof. In some embodiments, the aluminum salt comprises aluminum nitrate or a hydrate thereof Suitable zirconium salts include zirconium nitrate, zirconium acetate, zirconium chloride, zirconium isopropoxide, zirconium carbonate, zirconium citrate, hydrates of the foregoing salts, and mixtures thereof. In some embodiments, the zirconium salt comprises zirconium acetate or a hydrate thereof. In some embodiments, the aluminum salt comprises aluminum nitrate or a hydrate thereof, and the zirconium salt comprises zirconium acetate or a hydrate thereof.

When an alumina-zirconia with a low crystallization temperature is desired, the aqueous solution can comprise the dissolved aluminum salt and the dissolved zirconium salt in amounts sufficient to provide a molar ratio of aluminum to zirconium of about 2.4:1 to about 5.6:1, specifically about 3.0:1 to about 4.6:1. The aqueous solution can contain less than 2 weight percent, specifically less than 1 weigh percent, of components other than water, the dissolved aluminum salt, and the dissolved zirconium salt. In some embodiments, the aqueous solution consists of water, the dissolved aluminum salt, and the dissolved zirconium salt.

In order to control or modify the particle size of the amorphous alumina-zirconia, it is possible to comminute the solid formed after water removal and/or the alumina-zirconia particles formed after thermal treatment at 700-800° C. Suitable comminuting methods include, for example, grinding, ball milling, attrition milling, and sonication. Thus, in some embodiments, the method further comprises comminuting the solid before the maintaining the solid at a temperature of about 700 to about 800° C. And in some embodiments, the method further comprises comminuting the amorphous alumina-zirconia particles. As an example of comminuting the amorphous alumina-zirconia particles, the working examples below demonstrate ball-milling the amorphous alumina-zirconia particles using zirconium oxide ball-milling media in the presence of ethanol solvent.

In some embodiments, the amorphous alumina-zirconia particles prepared by the method have an average particle size of about 0.5 to about 200 micrometers, specifically about 1 to about 100 micrometers, more specifically about 2 to about 50 micrometers, still more specifically about 4 to about 40 micrometers, even more specifically about 4 to about 20 micrometers, yet more specifically about 4 to about 10 micrometers.

The invention includes at least the following embodiments.

Embodiment 1

A method of spray coating, comprising feeding an amorphous mixed metal oxide to a thermal spray coating device.

Embodiment 2

The method of embodiment 1, wherein the amorphous mixed metal oxide comprises at least two metals selected from the group consisting of Be, Mg, Ca, Sr, Ba, Ra, Sc, Y, Lu, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd, Hg, Al, Ga, In, and Tl.

Embodiment 3

The method of embodiment 1 or 2, wherein the amorphous mixed metal oxide comprises at least two metals selected from the group consisting of Al, Zr, Mg, Y, Gd, Ce, Ti, Fe, Co, Cr, Mn, Cu, Zn, Pb, and Ga.

Embodiment 4

The method of any of embodiments 1-3 wherein the amorphous mixed metal oxide comprises at least two metals selected from Al, Zr, Mg, Y, Gd, Fe, and Ce.

Embodiment 5

The method of any of embodiments 1-4, wherein the amorphous mixed metal oxide is selected from the group consisting of alumina-zirconia ($Al_2O_3$—$ZrO_2$), magnesia-yttria (MgO—$Y_2O_3$), yttria-yttria alumina garnet ($Y_2O_3$—YAG), alumina-yttria alumina garnet ($Al_2O_3$—YAG), alumina-spinel ($Al_2O_3$—$MgAl_2O_4$), zirconia-spinel ($ZrO_2$—$MgAl_2O_4$), zirconia-iron oxide ($ZrO_2$—$Fe_2O_3$), and mixtures thereof.

Embodiment 6

The method of any of embodiments 1-5, wherein the amorphous mixed metal oxide comprises alumina-zirconia.

Embodiment 7

The method of embodiment 6, wherein the alumina-zirconia comprises about 50 to about 70 weight percent alumina and about 30 to about 50 weight percent zirconia.

Embodiment 8

The method of any of embodiments 1-7, wherein the amorphous mixed metal oxide comprises at least 95 weight percent total of metal and oxygen.

Embodiment 9

The method of any of embodiments 1-8, wherein the thermal spray coating device utilizes a spray coating technique selected from the group consisting of suspension plasma spray coating, air plasma spray coating, vacuum plasma spray coating, ultra-high vacuum plasma spray coating, detonation spray coating, high velocity oxy fuel spray coating, and combinations thereof.

Embodiment 10

The method of any of embodiments 1-9, wherein the thermal spray coating device utilizes suspension plasma spray coating.

Embodiment 11

The method of any of embodiments 1-10, wherein the feeding an amorphous mixed metal oxide to a thermal spray coating device comprises introducing to a plasma jet a suspension of amorphous mixed metal oxide particles in water, an organic solvent, or a mixture thereof.

Embodiment 12

The method of any of embodiments 1-11, further comprising depositing molten mixed metal oxide on a substrate and cooling the deposited mixed metal oxide to form an as-sprayed coating, wherein the as-sprayed coating comprises splats having a diameter of about 0.5 to about 10 micrometers and spheroids having a diameter of about 40 to about 200 nanometers.

Embodiment 13

The method of any of embodiments 1-12, wherein the amorphous mixed metal oxide has an average particle size of about 0.5 to about 200 micrometers.

Embodiment 14

The method of any of embodiments 1-13, wherein the amorphous mixed metal oxide comprises alumina-zirconia; and wherein the method further comprises depositing molten mixed metal oxide on a substrate and cooling the deposited mixed metal oxide to form an as-sprayed coating comprising an α-alumina phase and a tetragonal zirconia phase.

Embodiment 15

The method of embodiment 14, wherein the α-alumina phase comprises a grain size of about 20 to about 30 nanometers, and the tetragonal zirconia phase comprises a grain size of about 14 to about 22 nanometers.

Embodiment 16

The method of any of embodiments 12-15, wherein the as-sprayed coating is chemically homogeneous on a scale of 300 nanometers.

Embodiment 17

The method of any of embodiments 14-17, wherein the as-sprayed coating has a density of about 90 to about 95 percent relative to a bulk alumina-zirconia of the same composition.

Embodiment 18

The method of any of embodiments 14-17, wherein the as-sprayed coating has a Vickers hardness of about 9 to about 11 gigapascals measured at 23° C. using a 1.6 Newton normal load and a 15 second dwell time.

Embodiment 19

The method of embodiment 1, wherein the amorphous mixed metal oxide comprises alumina-zirconia; wherein the thermal spray coating device is a suspension plasma spray coating device; wherein the feeding an amorphous mixed metal oxide to a thermal spray coating device comprises introducing to a plasma jet a suspension of amorphous alumina-zirconia particles in water, an organic solvent, or a mixture thereof; wherein the alumina-zirconia particles comprise about 50 to about 70 weight percent alumina and about 30 to about 50 weight percent zirconia; wherein the amorphous alumina-zirconia particles have an average particle size of about 2 to about 10 micrometers; wherein the method further comprises depositing molten alumina-zirconia on a substrate and cooling the deposited alumina-zirconia to form an as-sprayed coating comprising an α-alumina phase and a tetragonal zirconia phase; wherein the α-alumina phase comprises a grain size of about 20 to about 30 nanometers, and the tetragonal zirconia phase comprises a grain size of about 14 to about 22 nanometers; and wherein the as-sprayed coating is chemically homogeneous on a scale of 300 nanometers.

Embodiment 20

An alumina-zirconia coated substrate prepared by the method of embodiment 19.

Embodiment 21

A nanostructured alumina-zirconia coating, comprising an α-alumina phase comprising a grain size of about 20 to about 30 nanometers; and a tetragonal zirconia phase comprising a grain size of about 14 to about 22 nanometers; wherein the coating is chemically homogeneous on a scale of 300 nanometers.

Embodiment 22

A method of preparing amorphous alumina-zirconia particles, comprising: removing water from a aqueous solution to form a solid, wherein the aqueous solution comprises a dissolved aluminum salt and a dissolved zirconium salt; and maintaining the solid at a temperature of about 700 to about 800° C. for about 0.5 to about 5 hours to form the amorphous alumina-zirconia particles.

Embodiment 23

The method of embodiment 22, wherein the removing water comprises evaporating water from the aqueous solution at a temperature of about 70 to about 105° C.

Embodiment 24

The method of embodiment 22 or 23, wherein the aluminum salt is selected from the group consisting of aluminum nitrate, aluminum acetate, aluminum chloride, aluminum isopropoxide, aluminum carbonate, aluminum citrate, hydrates of the foregoing salts, and mixtures thereof.

Embodiment 25

The method of any of embodiments 22-24, wherein the aluminum salt comprises aluminum nitrate or a hydrate thereof.

Embodiment 26

The method of any of embodiments 22-25, wherein the zirconium salt is selected from the group consisting of zirconium nitrate, zirconium acetate, zirconium chloride, zirconium isopropoxide, zirconium carbonate, zirconium citrate, hydrates of the foregoing salts, and mixtures thereof.

Embodiment 27

The method of any of embodiments 22-26, wherein the zirconium salt comprises zirconium acetate or a hydrate thereof.

Embodiment 28

The method of any of embodiments 22-27, wherein the aluminum salt comprises aluminum nitrate or a hydrate thereof, and the zirconium salt comprises zirconium acetate or a hydrate thereof.

Embodiment 29

The method of any of embodiments 22-28, wherein the aqueous solution comprises the dissolved aluminum salt and the dissolved zirconium salt in amounts sufficient to provide a molar ratio of aluminum to zirconium of about 2.4:1 to about 5.6:1.

Embodiment 30

The method of any of embodiments 22-29, wherein the aqueous solution consists of water, the dissolved aluminum salt, and the dissolved zirconium salt.

Embodiment 31

The method of any of embodiments 22-30, further comprising comminuting the solid before the maintaining the solid at a temperature of about 700 to about 800° C.

Embodiment 32

The method of any of embodiments 22-31, further comprising comminuting the amorphous alumina-zirconia particles.

Embodiment 33

The method of any of embodiments 22-32, wherein the amorphous alumina-zirconia particles have an average particle size of about 0.5 to about 200 micrometers.

The invention is further illustrated by the following non-limiting examples.

General Procedures for Powder Preparation

Chemical precursors such as metal nitrate, acetate, chloride, isopropoxide, etc. are used as precursors for the preparation of multicomponent amorphous ceramic powders. The chemical precursors are dissolved in water or ethanol or other solvents to form a solution. The solution is stirred continuously to make sure the chemicals are mixed uniformly. Then the solution is heat treated on hot plate or other suitable heating device at a temperature of approximately 100° C. to remove the solvent and produce a dried powder. Thermogravimetric-Differential Thermo Analysis (TG-DTA) is used to study the dried powder pyrolysis and crystallization behaviors. The amorphous powders are then made at the temperatures above the precursor pyrolysis temperature and below the crystallization temperature. In an alternative to drying followed by heat treatment, powders may be produced by spray pyrolysis in a standard furnace or microwave device. TG-DTA can still be used to estimate processing temperatures however, due to higher heating rates experimental adjustments may be needed. The faster heating of the spray pyrolysis route may produce amorphous powders at lower temperatures or even ones not producible by the dried powder route.

The powder produced as described above is substantially homogeneous consisting of molecularly mixed oxides of the two or more metal ions. Some small, incompletely mixed regions may exist, however they exist on a submicron size scale and will melt very rapidly at the interface between material regions of first metal oxide and the second metal oxide such that in any processing including thermal spray melting will be at the lower melt temperature of mixed metal oxide rather than at that of either individual metal oxide.

In contrast, when materials are made of powders of a first metal oxide mixed with powders of a second metal oxide, the resulting microstructure is almost always spatially inhomogeneous consisting of regions of the first metal oxide and regions of the second metal oxide. A clear example of this is show in FIG. 4 with the material on the top left marked (a) plasma sprayed coating made from the amorphous powders being clearly much more homogeneous than (b) a plasma sprayed coating using $Al_2O_3$ and $ZrO_2$ mixed powders, and (c) a plasma sprayed coating using crystalline $Al_2O_3$ and $ZrO_2$ powders.

The amorphous powder can be used to obtain a final densified ceramic by powder consolidation using pressure-less sintering in a vacuum, air, or gas atmosphere, Hot Isostatic Pressing, Hot Pressing, Spark Plasma Sintering, and other similar methods. It has been demonstrated that phase changes in some cases promote densification including the phase change from amorphous to crystalline. The powders produced as above have a homogeneity advantage and in some cases a densification advantage over crystalline powders.

Thermal Spray Using Amorphous Powders

The most important use of the produced amorphous powders is thermal spray such as Air Plasma Spray (APS), Vacuum Plasma Spray (VPS), Detonation Spray, and High Velocity Oxy Fuel Spray (HVOF). To carry out such spray starting with the synthesized powder especially for development work suspension spray can be done as follows. Conventional powder spray can also be done by agglomerating powders to sprayable size.

Suspension Preparation.

The as-made amorphous powders were mixed in ethanol or water and ball milled for 48 hours.

Powder Agglomeration.

Conventional powder feed spraying is done with powders larger than 10 micrometers because smaller particles have ratios of surface force to inertia that are too large to permit them to be fed properly in known powder feeders. The current amorphous powder can be made into an agglomerated form by standard means, which include spray drying with or without subsequent heat treatment and making a fused and crushed powder.

Plasma Spray Process.

Plasma spray can be done using standard means. If a powder is made standard powder spray methods can be done using a fluidized bed powder feeder, a metering wheel feeder, or any other type of feeder. Suspension spray may also be used. In suspension spray the suspension is atomized or stream injected into the heated jet including in a plasma jet or a combustion jet. The amorphous powder will melt in the plasma jet at a lower temperature than macroscopic mixed powders and form splats when impacting on the substrate. Because of the fine scale mixing of the elements in the amorphous powders, more homogeneous microstructure will result. Because of the molecular mixing of the melted material, metastable materials may be more readily made and such materials can have special and useful properties. These useful properties include extended solubilities that have been used in thermal barrier coatings that have improved resistance to chemical attack.

Preparation and Characterization of an Alumina-Zirconia Amorphous Powder

The precursor is an aqueous solution containing aluminum nitrate and zirconium acetate that are mixed based on molar volumes to produce a ceramic composition of $Al_2O_3$-40 wt % $ZrO_2$. Aluminum nitrate ($Al(NO_3)_3.9H_2O$; 1400 grams) was dissolved in deionized water (500 milliliters) to form an aluminum nitrate solution. The aluminum nitrate solution was mixed with a zirconium acetate solution (78 grams of water and 22 grams of zirconium acetate ($ZrO(O_2CCH_3)_2$; equivalent to 22 weight percent $ZrO_2$) to produce a combined mixture with an aluminum to zinc ratio corresponding to a ceramic eutectic composition of $Al_2O_3$-40 wt % $ZrO_2$. The combined mixture, having a volume of about 2.5 liter, was mixed to form a homogeneous precursor solution, which was dried over the course of about three hours on a hot plate at about 100° C. The as-dried powder was lightly ground in a motor to break up the agglomerates.

Both differential thermal analysis (DTA) and thermal gravimetric analysis (TGA) experiments were performed simultaneously on the as-dried precursor powders using an SDT-Q6000 thermal analyzer (TA Inc. New Castle, Del., USA). Thermal analysis was performed in flowing air by heating the precursor powders from room temperature to 1200° C. at a rate of 10° C./minute. $Al_2O_3$ powder was used as a reference material. FIG. 1 shows representative TG-DTA curves for the crystallization of as-dried precursor obtained at a heating rate of 10° C./minute in air. The sample weight decreases with increasing temperature continuously from room temperature to about 500° C., and the total weight loss is about 64 weight percent. The exothermic peaks at 277° C. and 353° C. can be attributed to the pyrolysis of the precursor, because a significant weight loss occurs at this temperature range. The exothermic DTA peak at 939° C. and 1287° C. can be ascribed to the crystallization of zirconia and alumina, respectively. Additional characterization of the amorphous powder is reported in D. Chen, E. H. Jordan, and M. Gell, "Suspension plasma sprayed composite coating using amorphous powder feedstock", *Applied Surface Science*, 255 (2009) 5935-5938, which is incorporated herein by reference in its entirety.

Suspension Preparation

Figure 2:
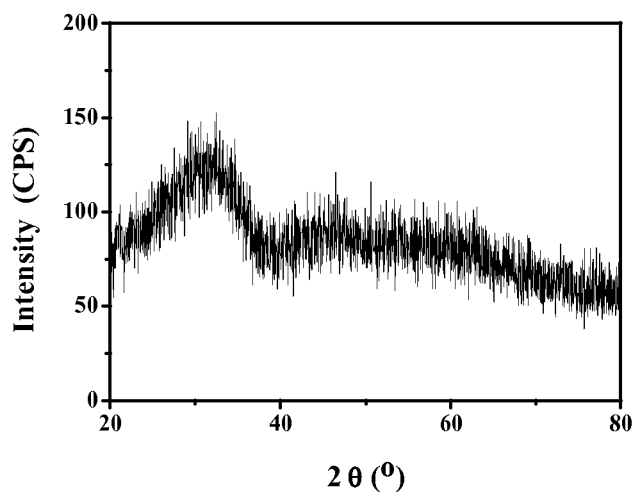
FIG. 2 is an x-ray diffraction (XRD) pattern of amorphous $Al_2O_3$-40 wt % $ZrO_2$ powders.

The as-dried powders were further heat treated at 750° C. for 1 hour on the hot plate. The resulting powders are amorphous (FIG. 2). Then the amorphous powders were mixed and ball-milled in ethanol using $ZrO_2$ as ball milling media.

Coating Deposition

Figure 3:
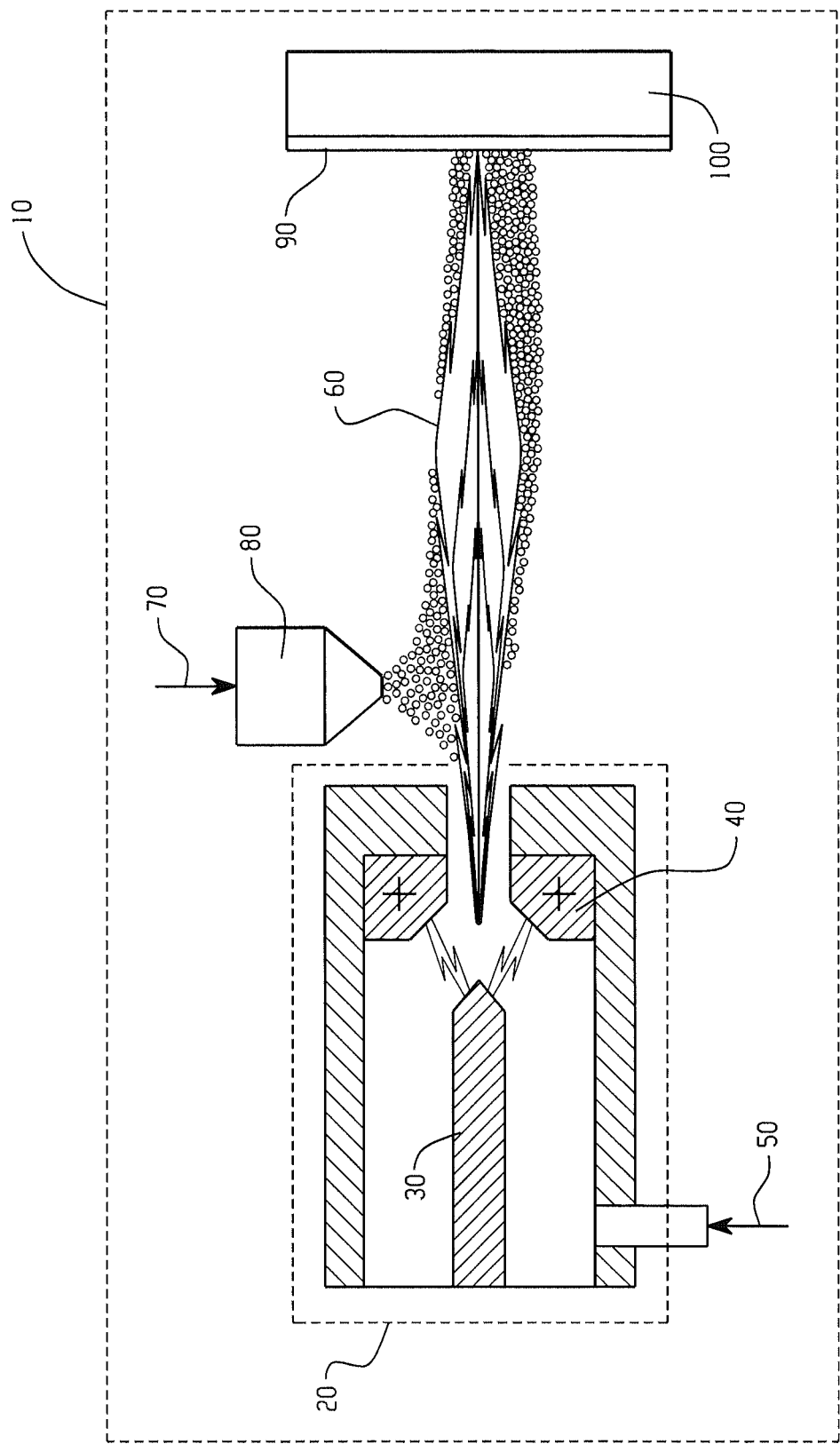
FIG. 3. is a schematic illustration of a suspension plasma spray process.

The ethanol suspension containing amorphous powders was atomized and sprayed into the high temperature plasma jet. FIG. 3 is a schematic illustration of a suspension plasma spray system 10 comprising a plasma discharge unit 20 with tungsten cathode 30 and copper anode 40; a plasma precursor gas 50 is introduced into the plasma discharge unit 20, and a plasma jet 60 exits; a suspension 70 of the amorphous powder is introduced as a mist to the plasma jet via atomizing nozzle 80; the plasma jet 60 produces a coating 90 on substrate 100. The direct current (DC) plasma torch used here is the Metco 9MB (Sulzer Metco, Westbury, N.Y.), which was attached to a six-axis robotic arm. Argon and hydrogen are used as the primary and the secondary plasma gases, respectively. The coating was deposited on Type 304 stainless steel substrates (disks 25 millimeter diameter, 3 millimeter thickness), surfaces of which were previously roughened by grit blasting ($Al_2O_3$ grit of #30 mesh size). Coating deposition parameters used in this research are given in Table 1.

TABLE 1

| Suspension plasma spray conditions for spraying of $Al_2O_3$—$ZrO_2$ coatings | |
|---|---|
| Parameter | Value |
| power | 40-50 kW |
| atomizing gas | $N_2$ |
| suspension flow rate | 10-30 mL/min |
| spraying distance | 40-75 mm |
| traverse speed | 300 mm/sec |
| substrate | stainless steel |
| no. of passes deposited | 25 |

Figure 5:
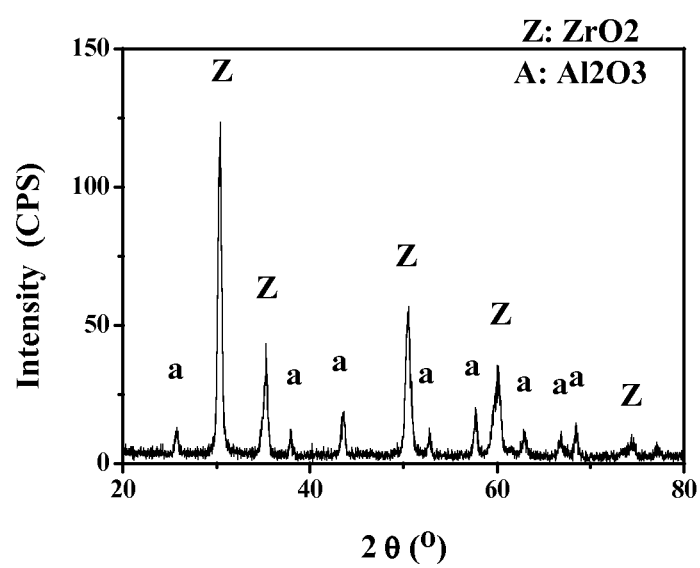
FIG. 5 is an XRD pattern of an as-sprayed $Al_2O_3$-40 wt % $ZrO_2$ coating.

In the plasma spray process, 30 coating scans were carried out. A typical polished cross-section of the $Al_2O_3$-40 wt % $ZrO_2$ coating is shown in FIG. 4(a). The average Vickers hardness of the as-sprayed coating is 9.9 gigapascals, measured at 23° C. using a 1.6 Newton normal load and a 15 second dwell time. For comparison, the $Al_2O_3$-40 wt % $ZrO_2$ coatings were also sprayed using conventional plasma spray process (FIG. 4(b)) and the suspension plasma spray process using crystalline $Al_2O_3$ and $ZrO_2$ Powders (FIG. 4(c)). As can be seen in FIG. 4(a), there are no coarse splat boundaries or layer structures in the as-sprayed two phase coatings prepared by suspension plasma spray using amorphous powders. The results indicated that Al and Zr in the coating are uniformly distributed in the as-sprayed coatings. The XRD pattern (FIG. 5) shows that the as-sprayed coatings are composed of $ZrO_2$ and $Al_2O_3$ phases.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The invention claimed is:

1. A method of spray coating, comprising feeding an amorphous mixed metal oxide to a thermal spray coating device; wherein the amorphous mixed metal oxide is selected from the group consisting of alumina-zirconia ($Al_2O_3$—$ZrO_2$), magnesia-yttria (MgO—$Y_2O_3$), yttria-yttria alumina garnet ($Y_2O_3$—YAG), alumina-yttria alumina garnet ($Al_2O_3$—YAG), alumina-spinel ($Al_2O_3$—$MgAl_2O_4$), zirconia-spinel ($ZrO_2$—$MgAl_2O_4$), zirconia-iron oxide ($ZrO_2$—$Fe_2O_3$), and mixtures thereof.

2. The method of claim 1, wherein the amorphous mixed metal oxide comprises alumina-zirconia.

3. The method of claim 2, wherein the alumina-zirconia comprises about 50 to about 70 weight percent alumina and about 30 to about 50 weight percent zirconia.

4. The method of claim 1, wherein the amorphous mixed metal oxide comprises at least 95 weight percent total of metal and oxygen.

5. The method of claim 1, wherein the thermal spray coating device utilizes a spray coating technique selected from the group consisting of suspension plasma spray coating, air plasma spray coating, vacuum plasma spray coating, ultra-high vacuum plasma spray coating, detonation spray coating, high velocity oxy fuel spray coating, and combinations thereof.

6. The method of claim 1, wherein the thermal spray coating device utilizes suspension plasma spray coating.

7. The method of claim 1, wherein the feeding an amorphous mixed metal oxide to a thermal spray coating device comprises introducing to a plasma jet a suspension of amorphous mixed metal oxide particles in water, an organic solvent, or a mixture thereof.

8. The method of claim 1, further comprising depositing molten mixed metal oxide on a substrate and cooling the deposited mixed metal oxide to form an as-sprayed coating, wherein the as-sprayed coating comprises splats having a diameter of about 0.5 to about 10 micrometers and spheroids having a diameter of about 40 to about 200 nanometers.

9. The method of claim 8, wherein the as-sprayed coating is chemically homogeneous on a scale of 300 nanometers.

10. The method of claim 1, wherein the amorphous mixed metal oxide has an average particle size of about 0.5 to about 200 micrometers.

11. The method of claim 10, wherein the method further comprises depositing molten alumina-zirconia on a substrate and cooling the deposited alumina-zirconia to form an as-sprayed coating comprising an α-alumina phase and a tetragonal zirconia phase; and wherein the α-alumina phase comprises a grain size of about 20 to about 30 nanometers, and the tetragonal zirconia phase comprises a grain size of about 14 to about 22 nanometers.

12. The method of claim 10, wherein the as-sprayed coating has a density of about 90 to about 95 percent relative to a bulk alumina-zirconia of the same composition.

13. The method of claim 10, wherein the as-sprayed coating has a Vickers hardness of about 9 to about 11 gigapascals measured at 23° C. using a 1.6 Newton normal load and a 15 second dwell time.

14. The method of claim 1, wherein the amorphous mixed metal oxide comprises alumina-zirconia; and wherein the method further comprises depositing molten mixed metal oxide on a substrate and cooling the deposited mixed metal oxide to form an as-sprayed coating comprising an α-alumina phase and a tetragonal zirconia phase.

15. The method of claim 1,
wherein the amorphous mixed metal oxide comprises alumina-zirconia;
wherein the thermal spray coating device is a suspension plasma spray coating device;
wherein the feeding an amorphous mixed metal oxide to a thermal spray coating device comprises introducing to a plasma jet a suspension of amorphous alumina-zirconia particles in water, an organic solvent, or a mixture thereof;
wherein the alumina-zirconia particles comprise about 50 to about 70 weight percent alumina and about 30 to about 50 weight percent zirconia;
wherein the amorphous alumina-zirconia particles have an average particle size of about 2 to about 10 micrometers;
wherein the method further comprises depositing molten alumina-zirconia on a substrate and cooling the deposited alumina-zirconia to form an as-sprayed coating comprising an α-alumina phase and a tetragonal zirconia phase;
wherein the α-alumina phase comprises a grain size of about 20 to about 30 nanometers, and the tetragonal zirconia phase comprises a grain size of about 14 to about 22 nanometers; and
wherein the as-sprayed coating is chemically homogeneous on a scale of 300 nanometers.

16. An alumina-zirconia coated substrate prepared by the method of claim 15.

* * * * *